United States Patent [19]

Inoue

[11] 3,997,019
[45] Dec. 14, 1976

[54] SPEED CONTROL DEVICE FOR CONTROLLING THE TRAVELLING SPEED OF A VEHICLE

[75] Inventor: Tetsuo Inoue, Hamamatsu, Japan

[73] Assignee: Yamaha Hatsudoki Kabushiki Kaisha, Japan

[22] Filed: Mar. 5, 1975

[21] Appl. No.: 555,454

[30] Foreign Application Priority Data

Mar. 6, 1974 Japan .............................. 49-26062

[52] U.S. Cl. .......................... 180/105 R; 123/97 R; 188/110; 188/181 R
[51] Int. Cl.² ...................................... B60K 41/20
[58] Field of Search .......... 180/105 R, 105 E, 106, 180/107, 108, 109, 110; 188/110, 181 R; 123/97 R, 98

[56] References Cited

UNITED STATES PATENTS

| 1,251,176 | 12/1917 | Braun | 180/110 |
|---|---|---|---|
| 2,895,460 | 7/1959 | Brueder | 123/98 |
| 3,146,631 | 9/1964 | Banzhaf | 74/472 |
| 3,200,802 | 8/1965 | Diuhosch | 123/97 R |
| 3,331,478 | 7/1967 | Trifiletti | 180/105 R X |
| 3,659,570 | 5/1972 | Yoshino | 123/98 |
| 3,675,731 | 7/1972 | Stopera | 180/110 X |
| 3,757,758 | 9/1973 | Stoltman | 123/98 X |

FOREIGN PATENTS OR APPLICATIONS

| 16,548 | 10/1911 | United Kingdom | 180/105 R |
|---|---|---|---|
| 16,525 | 7/1911 | United Kingdom | 180/110 |

Primary Examiner—Robert R. Song
Assistant Examiner—John P. Silverstrim
Attorney, Agent, or Firm—Flynn & Frishauf

[57] ABSTRACT

A speed control device for a small-sized vehicle includes a centrifugal governor for generating a thrust corresponding to a centrifugal force generated by a wheel of the vehicle and a link mechanism for operatively connecting the centrifugal governor to a throttle valve and braking mechanism of the vehicle so that the throttle valve and braking mechanism may be operated in a correlationship by the thrust of the governor.

13 Claims, 1 Drawing Figure

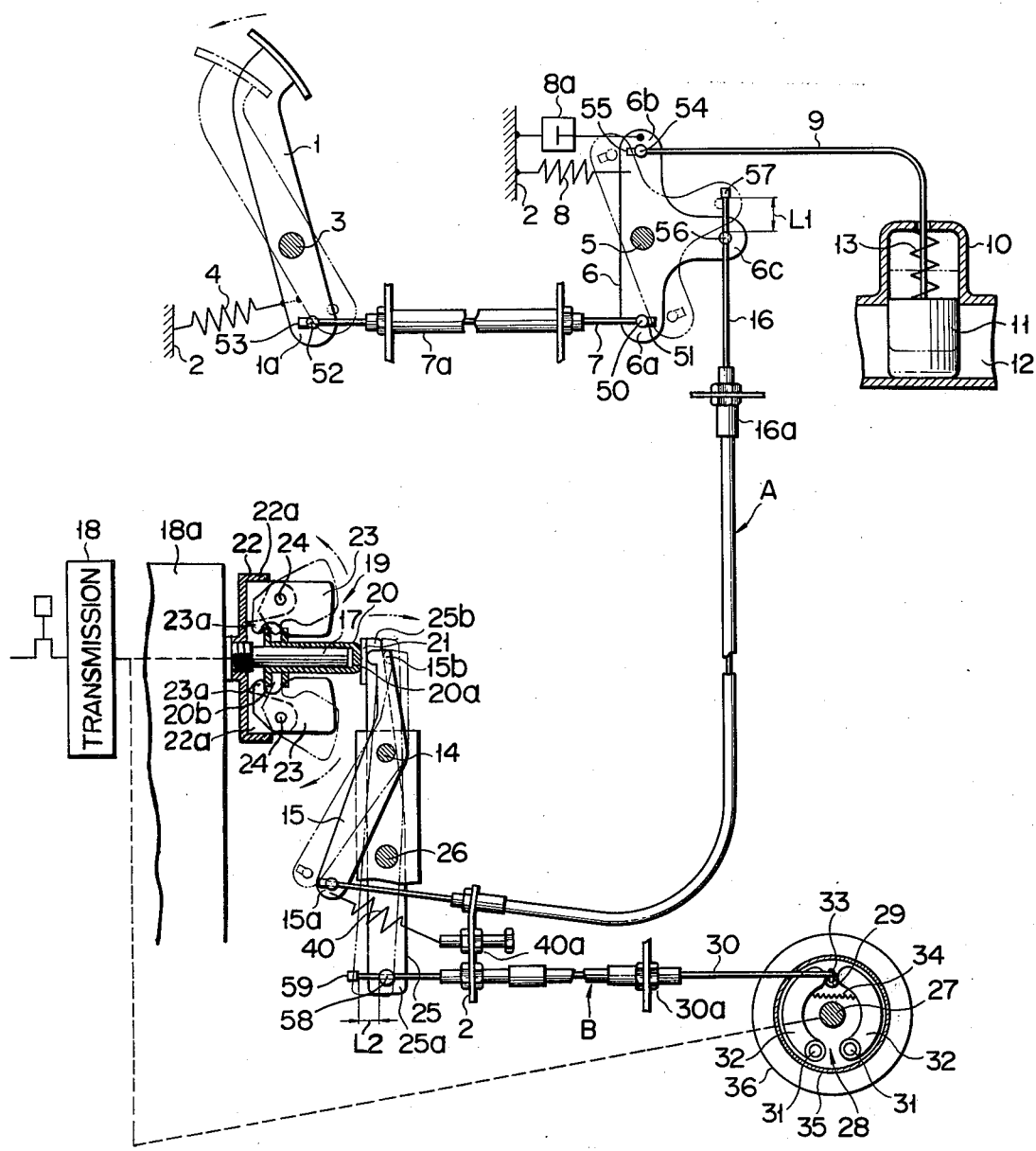

SPEED CONTROL DEVICE FOR CONTROLLING THE TRAVELLING SPEED OF A VEHICLE

BACKGROUND OF THE INVENTION

This invention relates to a speed control device for controlling the travelling speed of a small-sized vehicle such as a cultivator, snowmobile and leisure car.

In a small-sized vehicle of this type, a speed velocity is conventionally controlled by adjusting an amount of suction by means of, for example, a throttle valve. With such a vehicle no problem occurs during the normal travelling. Where, however, a travelling load is decreased as encountered with a fair wind and at the time of descending a hill, etc., there is such a risk that a vehicle speed will exceed a limit speed even when an accelerator pedal is released with the throttle valve closed.

The object of this invention is to provide a speed control device for a small-sized vehicle which is capable of controlling a small-sized vehicle at a predetermined speed corresponding in certain instances to pedal depression and irrespective of travelling load conditions such as road gradient, direction of wind and load weight.

BRIEF DESCRIPTION OF THE DRAWING

The single FIGURE is a side view, partly in section, showing a speed control device for a small-sized vehicle according to one embodiment of this invention.

DETAILED DESCRIPTION OF THE PREFERRED EMBODIMENTS

On a driving floor of a small-sized vehicle an accelerator pedal 1 is rotatably mounted on a body 2 of the vehicle by, for example, pivotally mounting the pedal 1 to a shaft 3. The accelerator pedal 1 is swingably urged in a clockwise direction by a tension spring 4 disposed between the lower end 1a of the pedal and the body 2 and normally placed in a position indicated by the solid line in the FIGURE. A first link member 6 has a downwardly extending lower arm portion 6a, an upwardly extending arm portion 6b and a horizontally extending arm portion 6c. A pin 50 is slidably inserted in a horizontal slot 51 of the lower arm portion 6a of the first link member 6 and another pin 52 is slidably inserted in a horizontal slot 53 of the lower end portion 1a of the accelerator pedal 1. A wire 7 including a wire-length adjusting device 7a has one end connected to the pin 52 at the lower end portion 1a of the accelerator member 6 and the other end connected to the pin 51 at the lower arm portion 6a of the first link member 6. A tension spring 8 with a damper 8a for the spring 8 is disposed between the body 2 and the upper arm 6b of the first link member 6 to normally impart an urging counterclockwise rotational force to the link member 6. The first link member 6 is normally located in a position indicated by a solid line in the FIGURE where it is balanced.

One end of a wire 9 is connected to a pin 54 which is slidably inserted in a slot 55 of the upper arm 6b of the first link member 6. The other end of the wire 9 extends in a direction opposite to the spring 8 and is connected to a throttle valve 11 for adjusting an amount of suction air of a carburetor 10 of an engine. On the throttle valve 11 is provided a compression spring 13 which is, when the first link member 6 is in a position indicated by a solid line, urged so as to enable the throttle valve 11 to close a suction passage 12 of the carburetor 10. When, on the other hand, the first link member 6 is rotated counterclockwise by the tension spring 8 under the influence of the damper 8a, the throttle valve 11 slides upwardly against the compression spring 13 to cause the suction passage 12 to be opened. On the horizontal arm 6c of the first link member 6 is provided a pin 56 extending in a direction perpendicular to the horizontal arm 6c and having a throughbore. A wire 16 is inserted through the throughbore of the pin 56 and an idle portion $L_1$ is normally occupied between the pin 56 and the upper anchoring portion or stop 57 of the wire 16. The lower end of the wire 16 is connected to the second member as will be later described. The length of the wire 16 may be adjusted by a conventional adjusting device 16a.

A cylindrical-shaped rotational member 17 is connected to the vehicle and adapted to be rotated at a speed by a member, for example, a known transmission 18 in its box 18a (in this embodiment), rotated at a ratio corresponding to a travelling speed of a power transmission system for a small-sized vehicle. On the rotational member 17 is provided a centrifugal governor 19 adapted to be operated under a centrifugal force due to the rotation of the rotational member 17. A support plate 22 is coaxially rotated together with the rotational member 17 at the base end of the rotational member 17 i.e. on the side of the transmission. Four forwardly extending support blades 22a are provided on the support plate 22 at intervals of 90° with respect to each other. A centrifugal weight 23 are rotatably supported by a pin 24 on the support piece 22a. The weight 23 has at its base a projecting portion 23a extending in the direction of the rotational member 17. A slidable cylinder 20 is coaxially capped on the outside of the rotational member 17. The slidable cylinder 20 has an abutting portion 20a at the forward end and an engaging flange portion 20b at the base portion. A flange portion 23a of the weight 23 is engaged with the engaging flange portion 20b of the cylinder 20. As a result, as the rotational speed of the rotation member 17 increases, the weight 23 is rotated in a direction indicated by an arrow with the pin 24 as a center of rotation and the projecting portion 23a is moved forward to push the flange portion 20b forwardly (to the right in the FIGURE). A second link member 15 is provided on the forward side of the slidable cylinder 20 so that the upper end portion 15b of the lever 15 confronts the abutting portion 20a of the slidable cylinder 20. The center portion of the second link member 15 is rotatably supported by a pin 14 and the other end of the wire 16 connected to the first link member 6 is coupled to the lower end portion 15a. At the lower end portion 15a of the second link member 15 is provided a tension spring 40 adapted to impart a counterclockwise rotational force to the link member 15. The initial tension of the spring 40 may be adjusted by an adjusting device 40a comprised of a bolt-nut assembly.

A link mechanism A is constructed by the second link member 15, wire 16, first link member 6 and wire 9, which operatively connects the centrifugal governor 19 to the throttle valve 11.

The center of a third link member 25 is rotatably supported by a support shaft 26. A plate like shock member 21 is integrally mounted on an end portion 25b of the link member 25. The shock member 21 is disposed between the abuttting portion 20a of the slidable cylinder 20 and the upper end portion 15b of the second link member 15, and normally urged, in a direction indicated by the solid line, into abutment with the abutting portion 20a through the upper end portion 15b of the second link member 15. The lower end portion 25a of the third link member 25 is operatively connected to a known brake mechanism 28 for braking the rotation of a wheel so that the operation of the control mechanism 28 is controlled by the rotation of the link mechanism 25. That is, one end of the wire 30 is coupled at the lower end portion 25a of the third member 25 and the other end of the wire 30 is connected through a lever 33 to a control member 29 of the control mechanism 28. One end portion of the wire 30 is inserted through a hole of a pin 58 which projects from the lower end portion 25a of the link member 25. An idle portion $L_2$ is provided between the enlarged forward end portion 59 of wire 30 and the pin 58. $L_2$ may be controlled by a conventional device 30a for adjusting the overall length of the wire 30. The braking mechanism 28 has a pair of brake members 32 each having one end pivotally supported by a pin 31, a tension spring 34 connected between the members 32 to urge them in a direction near to each other with the pin 31 as a center of rotation, and a brake drum 35 mounted around the outer periphery of the brake member 32 as well known in the art of this field. A wheel 36 is disposed around the outer periphery of the brake drum 35 so as to be rotated together with a shaft 27. As a result, when the cam member 29 is moved by pulling the wire 30, the brake members 32 are swung outwardly against a tension force of the spring 34 and pressed onto the braking drum 35, thereby braking the wheel 36.

A link mechanism B comprises the third link member 25 and the wire 30 and connects the centrifugal governor 19 to the brake mechanism 28.

The second link lever 15 and the third link lever 25 may be so constructed that a lever ratio $\epsilon_2$ of the second lever 15 is greater than a lever ratio $\epsilon_1$ of the third lever 25. Where the lever ratios $\epsilon_1$ and $\epsilon_2$ are respectively represented by $la_2/la_1$ and $lb_2/lb_1$, $la_1$ is a length and defined as a lever ratio for a braking mechanism and a lever ratio for a throttle valve between the pin 26 and the shock member 21; $la_2$ a length between the pin 26 and the pin mounted on the lower portion 25a of the lever 25; $lb_1$ a length between the pin 14 and the shock member 21; $lb_2$ a length between the pin 14 and the pin mounted on the lower portion 15a of the lever 15. The link members constructed as described above may obtain a sufficient force for braking the wheel because the throttle valve may be operated with the smaller force.

In the present invention, one lever may be used instead of two separate levers 15, 25, which is pivoted at the center, associated to the slidable cylinder 20 at the top and connected to the respective wires 16, 30 at different locations of the lower portion of the lever.

The operation of the above-mentioned control device will now be explained below.

When the accelerator pedal 1 is depressed against the force of the tension spring 4, the first link member 6 connected through the wire 7 to the accelerator pedal 1 is swung counterclockwise by the tension spring 8 to an extent corresponding to an amount of depression of the accelerator pedal 1. As a result, the throttle valve 11 is raised, through the wire 9, against the force of the compression spring 13 to cause the suction passage 12 to be opened. This causes an amount of air corresponding to the degree of opening of the suction passage 12 to be admitted into the engine so that the vehicle is run. When an amount of depression of the accelerator pedal 1 exceeds more than a preset value, the idle length $L_1$ of the wire 16 is cleared and the pin 56 abuts against stop 57 preventing further counterclockwise rotation of the first link member 6. A further counterclockwise rotation of the first link member 6 and thus further opening of the throttle valve 11 are controlled through the wire 16 under the influence of the second link member 15 which may raise the position of the stop 57 upwardly depending upon vehicle operating conditions.

Even when the accelerator pedal 1 is depressed to a predetermined extent, if the travelling load is increased against a wind and a time of an ascent etc. as compared with a normal case, the vehicle speed is lowered. With the lowered speed of the vehicle the rotational speed of the rotational member 17 operatively connected to the transmission 18 is lowered, and the extent of rotation of the centrifugal weight 23 adapted to be rotated outwardly under the force of a centrifugal force due to the rotation of the rotational member 17 is decreased. As a result, the projecting portion 23a of the weight 23 is shifted rearwardly and the slidable barrel 20 depressed rearwardly by the tension spring 40 through the second link member 15 is slid rearwardly. Simultaneous with the sliding movement of the slidable barrel 20 the second link member 15 is swung counterclockwise by the tension force of the spring 40 so that the wire 16 is slackened. As a result, if the pedal 1 is sufficiently depressed, the first link mechanism 6 is swung counterclockwise by the force of the tension spring 8 to cause the degree of opening of the throttle valve 11 to be increased. Consequently, the amount of suction air is increased, resulting in an increase of the wheel speed. At a fair wind (i.e. in the direction of vehicle movement) and at the time of descent etc. a travelling load is decreased. Though the speed of the vehicle is increased during the self travelling even in the event of the closure of the throttle valve 11, the rotational speed of the rotation member 17 is increased at this time and the thrust of the projecting portion 23a of the centrifugal weight 23 for the centrifugal governor 19 is increased. The slidable barrel 20 is slid forwardly and the third link member 25 depressing the slidable barrel 20 through the shock member 21 is swung clockwise against the force of the tension spring 40 to permit the idle length $L_2$ of wire 30 to be cleared. As a result, the wire 30 is held taut and the braking mechanism 28 is operated, thereby restricting the rotation of the wheel 36. The travelling speed of the wheel is thus decreased.

With the above described device of this invention, the required repeated braking generally leads to an increased wear of the brake lining, making it necessary to adjust the brake clearance many times. However, adoption of the already known automatic brake clearance control mechanisms eliminates the necessity to make such adjustments.

What is claimed is:

1. A speed control device for controlling the travelling speed of a wheeled vehicle including a rotating member rotated at a rate which is a function of the wheel speed of the vehicle, a throttle valve for adjusting the amount of suction air controlling the motor of the vehicle and a braking mechanism for braking the rotation of a wheel of the vehicle, comprising:

a centrifugal governor means coupled to said rotating member for generating a thrust corresponding to a centrifugal force generated by the rotation of the rotating member; and a link mechanism for operatively connecting the centrifugal governor means to the throttle valve and to the braking mechanism so that the thrust of the governor means causes the throttle valve and the braking mechanism to be operated in a correlationship, said link mechanism including a lever assembly having first and second levers, one end of both said levers being coupled to the governor means so as to be substantially simultaneously forcedly moved by the thrust of the governor means, the other end portion of the first lever connected to the throttle valve and other end portion of the second lever being coupled to the braking mechanism, said levers each having a center pivoted portion pivoted at respective different pivot points, the lever ratio of the first lever for the throttle valve being greater than the lever ratio of the second lever for the braking mechanism.

2. A speed control device according to claim 1 wherein the rotating member is rotated at a rate which is proportional to the wheel speed of the vehicle.

3. A speed control device according to claim 1 wherein the pivot points of the first and second levers are located at different distances from the governor means.

4. A speed control device according to claim 3 wherein the pivot point of the first lever is located closer to the governor means than the pivot point for the second lever.

5. A speed control device according to claim 1 wherein the second lever is longer than the first lever.

6. A speed control device according to claim 1, comprising means connecting said link mechanism to the throttle valve and braking mechanism with an idle motion area therebetween.

7. A speed control device according to claim 6 wherein said connecting means further includes adjusting means for adjusting an amount of said idle motion.

8. A speed control device according to claim 6 wherein said connecting means comprises a pin member protruding from said other end portion of a lever, said pin member having a hole therethrough, said hole being oriented substantially perpendicular to the longitudinal axis of the pin member, and a wire member coupled to one of said braking mechanism and throttle valve and passing through said hole in said pin member, and a stop member formed at the end of said wire to prevent said wire from slipping out of the hole of said pin member.

9. A speed control device according to claim 8 wherein said connecting means further includes adjusting means for adjusting an amount of said idle motion, said adjusting means comprising means for adjusting the overall length of said wire.

10. A speed control device according to claim 1 which further includes a spring for urging said one end portion of the lever assembly toward the rotating member.

11. A speed control device according to claim 10 which further includes adjusting means for adjusting the initial tension of the spring.

12. A speed control device according to claim 10 which further includes operating means for operating the throttle valve and further link mechanism, coupled with said first-mentioned link mechanism, operably connecting the operating means to the throttle valve.

13. A speed control device according to claim 12 further comprising a damper coupled to said further link mechanism for damping the movement of the throttle valve.

* * * * *